United States Patent [19]

Imamura et al.

[11] Patent Number: 4,764,833
[45] Date of Patent: Aug. 16, 1988

[54] PERPENDICULAR MAGNETIC HEAD

[75] Inventors: Tatsuo Imamura; Hiroyuki Yamamoto, both of Hachioji, Japan

[73] Assignee: Olympus Optical Company, Ltd., Tokyo, Japan

[21] Appl. No.: 788,337
[22] PCT Filed: Mar. 20, 1985
[86] PCT No.: PCT/JP85/00136
§ 371 Date: Dec. 23, 1985
§ 102(e) Date: Dec. 23, 1985
[87] PCT Pub. No.: WO85/04278
PCT Pub. Date: Sep. 26, 1985

[30] Foreign Application Priority Data

Mar. 20, 1984 [JP] Japan .................................. 59-53262

[51] Int. Cl.$^4$ .............................................. G11B 5/12
[52] U.S. Cl. ................................................ 360/126
[58] Field of Search .............. 360/122, 125, 126, 119, 360/121

[56] References Cited

U.S. PATENT DOCUMENTS

| 4,315,291 | 2/1982 | Lazzari ................................. 360/125 |
| 4,383,284 | 5/1983 | Isshiki ............................... 360/122 X |
| 4,385,334 | 5/1983 | Yanagida ............................. 360/125 |
| 4,571,653 | 2/1986 | Suzuki et al. ...................... 360/125 |

FOREIGN PATENT DOCUMENTS

| 56-44115 | 4/1981 | Japan . |
| 56-87220 | 7/1981 | Japan .................................. 360/125 |
| 57-111816 | 7/1982 | Japan . |
| 58-85913 | 5/1983 | Japan . |
| 58-150120 | 9/1983 | Japan . |

Primary Examiner—John H. Wolff
Attorney, Agent, or Firm—Louis Weinstein

[57] ABSTRACT

A perpendicular magnetic head for magnetizing a magnetic recording medium in the direction of thickness thereof comprises a main pole film of a magnetically soft material having a high magnetic permeability which is held sandwiched between a first and a second joined block, each formed of a non-magnetic material. A multi-layer film comprising alternate layers of a magnetically soft material having a high permeability and a non-magnetic material is disposed on at least one of the blocks in abutting relationship with the main pole film at a given distance spaced from an area of the main pole film which is disposed in sliding contact with a magnetic recording medium.

24 Claims, 4 Drawing Sheets

PERPENDICULAR MAGNETIC HEAD

FIELD OF THE ART

The invention relates to a magnetic head of perpendicular magnetization type, and more particularly, to a perpendicular magnetic head in which a main pole film formed by a magnetically soft film having a high permeability is held sandwiched between at least a first and a second non-magnetic block which are joined together.

BACKGROUND

In a perpendicular magnetic recording system in which a magnetic recording medium is magnetized in the direction of thickness, it is recognized that the shorter the wavelength of a magnetization which is magnetically recorded, the less in principle will be the self-demagnetization within the recording medium, a result that is suitable in achieving a high density recording (refer Nikkei Electronics, Oct. 25, 1982 Issue, pages 142 to 143).

A perpendicular magnetic recording requires a recording medium which exhibits a pronounced magnetic anisotropy in the perpendicular direction, and a magnetic recording head which develops a strong, sharply defined perpendicular component field. Known magnetic recording mediums which exhibit such a pronounced magnetic anisotropy in the perpendicular direction includes Co-Cr, barium ferrite, Co-O and the like. A magnetically soft film of a high magnetic permeability comprising Fe-Ni, permalloy, etc., is formed on a flexible base which may be formed by polyethylene terephthalate (PET) or the like, followed by Co-Cr film which is formed thereon, thus providing a two layer perpendicular magnetic recording medium which is suitable for a high density recording.

For use as a magnetic head which develops a strong, sharply defined perpendicular component field, there is proposed an auxiliary pole excited magnetic head (refer S. Iwasaki and Y. Nakamura; "An Analysis for the Magnetization Mode for High Density Magnetic Recording"; IEEE Trans. on Magn., Vol. MAG-13, No. 5, p 1272–1277, September 1977).

Such an auxiliary pole excited magnetic head 10 is illustrated in FIG. 1. As shown, it comprises a main pole 1, and an auxiliary pole 2 which is disposed in opposing relationship with the main pole 1 and is spaced therefrom by a given air gap 3, the auxiliary pole comprising a block 2a of a high permeability magnetic material such as ferrite and carrying a winding 2b thereon which is utilized to pass or develop an electric current representing information signal. During a recording and reproduction, a magnetic recording medium 4 is placed into the air gap 3 with the magnetized or magnetizable film of the medium 4 placed in sliding contact with the lower end face of the main pole 1. As shown in FIG. 2, the main pole 1 may comprise a film 1a of a magnetically soft material having a high permeability such as Co-Zr-Nb (hereafter referred to as a main pole film) which is held sandwiched between a pair of joined members such as a magnetic member 1b as may be formed from ferrite and a non-magnetic member 1c as may be formed from glass. Alternatively, a main pole 1' shown in FIG. 3 comprises the main pole film 1a which is held sandwiched between a joined member including the magnetic member 1b and the non-magnetic member 1c located on one side and a non-magnetic member 1c' which is constructed of the same material as that used to form the non-magnetic member 1c.

The magnetic recording and reproduction onto or from the magnetic recording medium 4 with the described head 10 takes place as follows: Initially, when effecting a magnetic recording, an electric current representing information signal which is fed from a suitable signal processing circuit, not shown, is applied to the winding 2b shown in FIG. 1, thereby causing the auxiliary pole 2 to develop a magnetic field. Under the influence of this field, a strong, sharply defined perpendicular field is produced through the main pole film 1a of the main pole 1, and such perpendicular field causes a reversal in the magnetization of the magnetizable film of the recording medium 4. During reproduction, the perpendicular field produced by the magnetization in the magnetizable film of the recording medium 4 magnetizes the main pole 1, and a change in the magnetization of the main pole 1 produces a change in the magnetization of the auxiliary pole 2, thus inducing an electric current through the winding 2b which may be derived externally and may be electrically processed in a suitable manner to provide a desired electrical signal.

It will be appreciated that a strong, sharply defined perpendicular field must be applied to the recording medium which is sufficient to cause a magnetic saturation thereof in order to achieve the perpendicular recording. In the prior art practice, the material used for the magnetic member 1b of the main pole comprises a block of ferrites such as Mn-Zn or Ni-Zn, which materials however do not exhibit satisfactory magnitude of initial permeability or frequency responses.

Specifically, FIG. 4 graphically shows the frequency responses of Ni-Zn ferrite (curve A) and that of Mn-Zn ferrite (curve B). Thus, the curve A indicates a favorable frequency response up to a high frequency region while the initial permeability $\mu i$ is low. Conversely, the curve B exhibits a high favorable initial permeability $\mu i$ while the frequency response thereof does not extend to a high frequency region. As illustrated by these examples, there has been no magnetizable material which satisfies the requirements of the initial permeability and the frequency response. The lack of a combination of these characteristics is attributable to the properties of the ferrite material themselves. As long as such ferrite material is used, it is difficult to provide a perpendicular magnetic recording head which satisfies both requirements.

Accordingly, it is an object of the invention to provide a perpendicular magnetic recording head which eliminates the disadvantages of the prior art by allowing a strong, sharply defined perpendicular field to be applied to a magnetic recording medium.

DISCLOSURE OF THE INVENTION

To achieve the above object, the invention provides a perpendicular magnetic recording head of a type in which a main pole film is held sandwiched between joined blocks of magnetic and/or non-magnetic members, wherein only non-magnetic members are used to hold the main pole film sandwiched therebetween and in which a multi-layer laminate block is disposed at the joining surface between the non-magnetic member and the main pole film at a given distance spaced from the area of sliding contact with a magnetic recording medium, the laminate comprising a lamination made up of alternating layers of magnetically soft material having a high permeability and layers of non-magnetic material, thereby enabling a strong, sharply defined perpendicular field to be developed.

BEST MODES OF CARRYING OUT THE INVENTION

Figure 5:
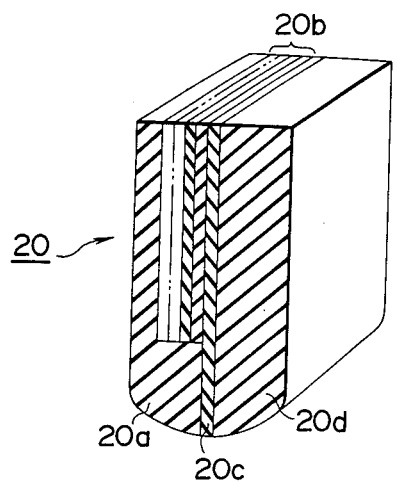
FIG. 5 is a perspective view, also showing the cross section, of a main pole of a perpendicular magnetic head according to the invention.

FIG. 5 is a perspective view of one form of a main pole used in the perpendicular magnetic head of the invention. As illustrated in cross section in FIG. 5, the main pole 20 shown comprises a very thin main pole film 20c of a rectangular sheet configuration. A non-magnetic member 20d having an increased thickness and a similar rectangular configuration is joined to the right side, as viewed in FIG. 5, of the film 20c, and defines a joined block. A rectangular multi-layer laminate or film 20b comprising a plurality of very thin films disposed in overlapping relationship with each other is joined to the left side of the main pole film 20c spaced upwardly at a given distance from the surface of the main pole film 20c where it is disposed in sliding contact with a magnetic record medium, or its bottom end face, as viewed in FIG. 5. Finally, a non-magnetic member 20a having an increased thickness is joined to the left side of the multi-layer laminate 20b and a portion of the main pole film 20c which is not disposed in abutting relationship with the laminate 20b. It will be noted that the lower end face of the composite assembly is polished to a curved surface having a given radius of curvature so as to be maintained in smooth sliding contact with a recording medium.

Figure 6:
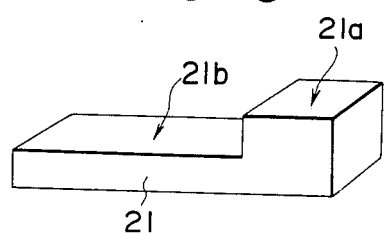
FIGS. 6 to 9 are perspective views, also illustrating the cross sections, of the components, as well as the steps of manufacturing the main pole shown in FIG. 5.
Figure 7:
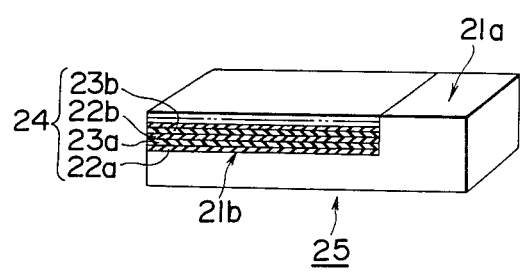
Figure 8:
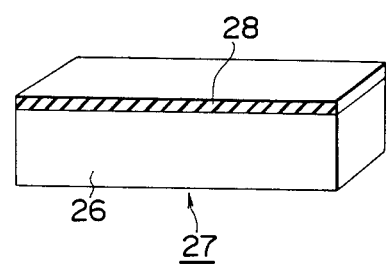

To form the main pole 20 as described, a rectangular body of ceramic or vitreous carbon material having a substantial thickness is initially prepared. As shown in FIG. 6, a cut is made into the upper surface of the body to a depth of about 100 micrometers ($\mu$m) over an area which is substantially equal to two thirds thereof, thus forming a non-magnetic member 21. Specifically, the upper surface of the non-magnetic member 21 includes a raised rectangular surface area 21a of a reduced size and another rectangular surface area 21b of a greater size which is offset downwardly by a step from the surface area 21a. Using a high frequency magnetron sputtering apparatus, 1 $\mu$m thick layers of $SiO_2$ and Co-Zr-Nb are alternately deposited on the rectangular surface 21b of the non-magnetic member 21 until 100 layers or more in total are deposited to define a multi-layer laminate or film. The non-magnetic member 21 having the laminate film thereon is removed from the sputtering apparatus, and the laminated surface is polished by suitable means. In this manner, a multi-layer laminate or film 24 having a total thickness of about 100 $\mu$m and comprising alternate thin films 22a, 22b, ... of $SiO_2$ and films 23a, 23b, ... of Co-Zr-Nb is obtained, as illustrated in FIG. 7, and the top surface of the laminate is polished to be level with the upper surface of the rectangular surface area 21a, thus providing a multi-layer non-magnetic member 25 which has both of its upper surfaces level with each other.

On the other hand, a body of ceramic or vitreous carbon which is substantially similar in configuration and size to that used to form the non-magnetic member 21 is also used in the same sputtering apparatus as mentioned, to deposit about 1 $\mu$m thick film 28 of Co-Zr-Nb on the upper surface of a non-magnetic member 26, which defines a main pole film, thus providing a non-magnetic member 27 carrying a single layer film.

Figure 9:
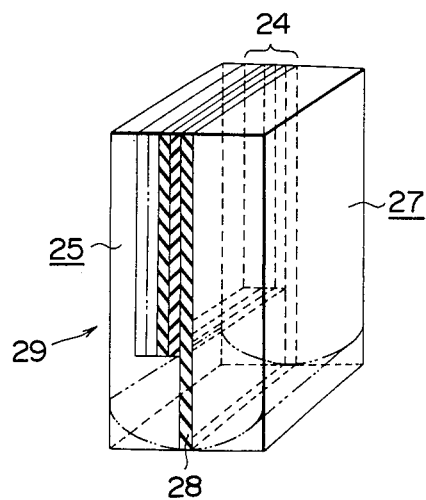

After the non-magnetic member 27 is removed from the sputtering apparatus, the non-magnetic member 27 is adhesively joined with the multi-layer non-magnetic member 25 using epoxy resin adhesive having a low viscosity, so that the Co-Zr-Nb film 28 of the non-magnetic member 27 is in abutting relationship with the multi-layer film 24 of the non-magnetic member 25, as shown in FIG. 9. When the bottom surface of the resulting composite assembly 29, as viewed in FIG. 9, is polished by suitable means until a given curvature is obtained so that the lower end face of Co-Zr-Nb film 28 represents a lowest point, there results the main pole 20 shown in FIG. 5. Thus, the Co-Zr-Nb film 28 corresponds to the main pole film 20c of the main pole 20 shown in FIG. 5, the multi-layer film 24 formed by $SiO_2$ and Co-Zr-Nb films corresponds to the multi-layer film 20b, and the non-magnetic member 27 and the multi-layer non-magnetic member 25 correspond to the non-magnetic members 20d and 20a, respectively.

Figure 10:
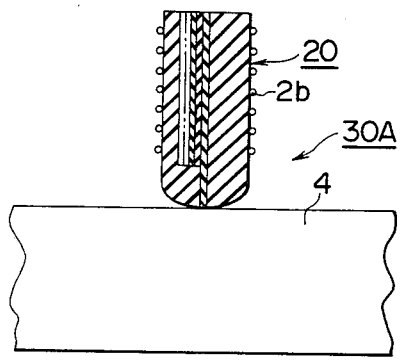
FIG. 10 is a cross section of a main pole excited perpendicular magnetic head according to a first embodiment of the invention.

FIG. 10 shows a perpendicular magnetic head 30A according to a first embodiment of the invention. The head 30A is constructed by using the main pole 20 which is formed as described above. Thus, a coil 2b through which information signal is directly passed is disposed around the periphery of the main pole 20 substantially in a region which is commensurate with the multi-layer film.

Figure 11:
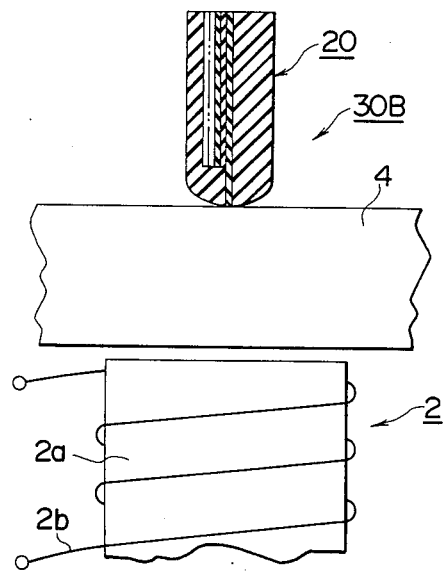
FIG. 11 is a front view, partly in section, of an auxiliary pole excited perpendicular magnetic head according to a second embodiment of the invention.

FIG. 11 shows a perpendicular magnetic head 30B according to a second embodiment of the invention. The head 30B is of an auxiliary pole excited type and utilizes the main pole 20 which is formed as described above.

Figure 1:
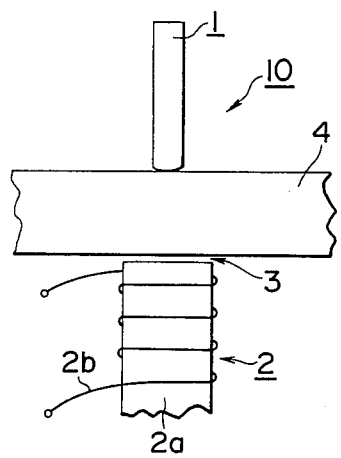
FIG. 1 is a front view of a conventional auxiliary pole excited perpendicular recording magnetic head in association with a magnetic recording medium.
Figure 2:
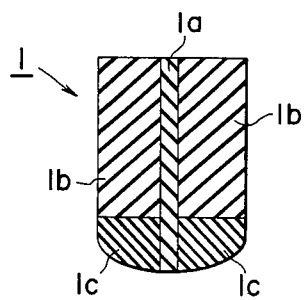
FIGS. 2 and 3 are schematic cross sections of several forms of a main pole used in perpendicular magnetic heads of the prior art.
Figure 3:
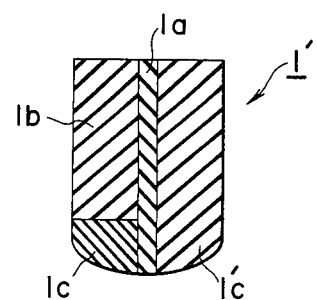
Figure 4:
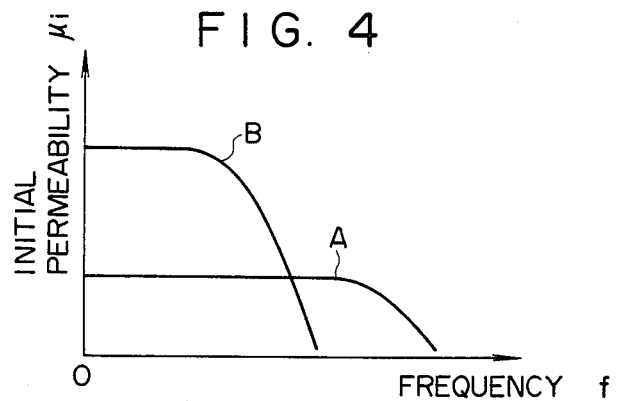
FIG. 4 graphically shows the initial permeability and a frequency response of conventional perpendicular magnetic heads.

When compared with conventional perpendicular magnetic heads as illustrated in FIGS. 2 and 3, it is found that when the perpendicular magnetic heads 30A and 30B of the invention are used, the strength of the perpendicular field which is applied to the magnetic recording medium 4 has increased by a factor of 2 or 3, in particular, in a high frequency region. In other words, the sensitivity for the recording and reproduction has been improved by a factor of 2 or 3 in the high frequency region.

Figure 12:
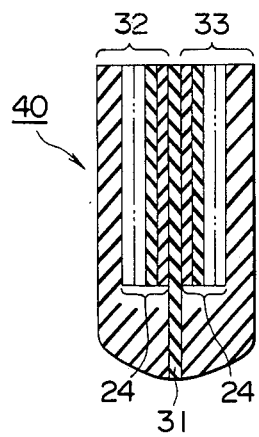
FIG. 12 is a cross section of another form of a main pole which may be used in the perpendicular magnetic head of the invention.

FIG. 12 shows another form of the main pole for the perpendicular magnetic head of the invention. A main pole 40 shown is similar in appearance and configuration to the main pole 20 shown in FIG. 5, but is different therefrom in that a pair of multi-layer films 24 are combined with a main pole 31. Specifically, a pair of non-magnetic members 32 and 33 which carry multi-layer films 24 constructed as mentioned above on their inside are disposed so as to hold the main pole film 31 sandwiched therebetween.

Figure 13:
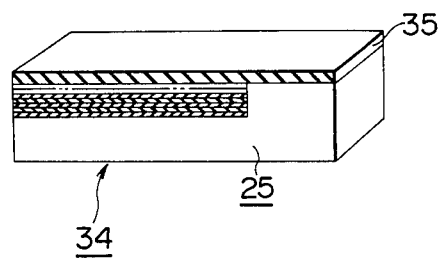
FIG. 13 is a perspective view of a non-magnetic member which is used in the manufacturing of a joined block which is used in the main pole structure of FIG. 12.

The main pole 40 can be formed by placing the multi-layer non-magnetic member 25 (see FIG. 7) in the sputtering apparatus to deposit about 1 μm thick main pole film of Co-Zr-Nb on the surface of the member 25 which carries the multi-layer film 24, thus providing a non-magnetic member 34 shown in FIG. 13 which comprises the non-magnetic member 25 mentioned above and the main pole film 35 of Co-Zr-Nb. The non-magnetic member 34 can be joined together with the non-magnetic member 25 shown in FIG. 7 so that the film 35 is disposed in abutting relationship with the multi-layer film of the member 25, using epoxy resin adhesive, followed by polishing the bottom end to a given curvature to provide a main pole 40 as illustrated in FIG. 12.

Figure 14:
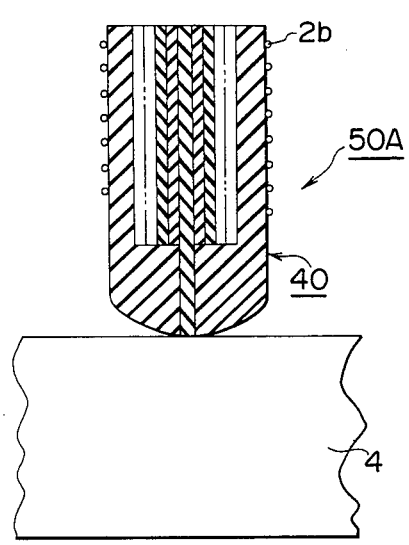
FIG. 14 is a cross section of a main pole excited perpendicular magnetic head according to a third embodiment of the invention.

FIG. 14 shows a perpendicular magnetic head 50A according to a third embodiment of the invention. The head 50A is constructed by using the main pole 40 shown in FIG. 12, and includes a coil 2b which is directly disposed around the main pole in a region commensurate with the multi-layer films for passing information signal therethrough.

Figure 15:
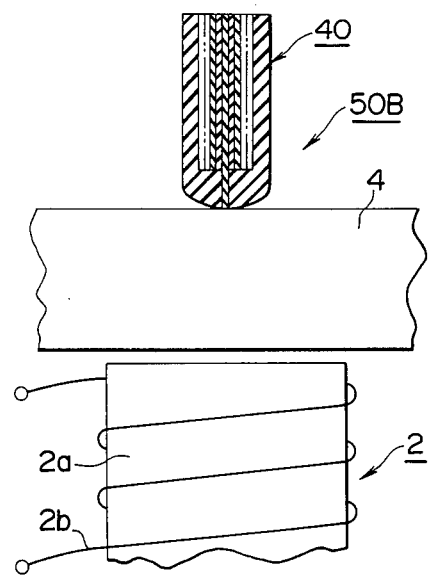
FIG. 15 is a front view, partly in cross section, of an auxiliary pole excited perpendicular magnetic head according to a fourth embodiment of the invention.

FIG. 15 shows a perpendicular magnetic head 50B of an auxiliary pole excited type according to a fourth embodiment of the invention, which is constructed by utilizing the main pole 40 described above.

It is found that the use of these perpendicular magnetic heads 50A and 50B has improved the recording and reproduction sensitivity by a factor of 2 or 3 as compared with the conventional construction, particularly in the high frequency region. In the described embodiments, the multi-layer film has been described as comprising $SiO_2$ and Co-Zr-Nb, but the materials which can be used to define the multi-layer film is not limited thereto, and the material $SiO_2$ may be replaced by other insulating materials and the material Co-Zr-Nb may be replaced by other materials which exhibit a satisfactory magnetically soft property.

INDUSTRIAL USE

As described, the perpendicular magnetic head of the invention is capable of developing a strong, sharply defined perpendicular field which allows the strength of the perpendicular field to be increased by a factor of 2 or 3 over conventional apparatus, in particular in the high frequency region, thus providing heads which are suitable for use in a high density recording.

We claim:

1. A perpendicular magnetic head comprising:
at least first and second joined blocks which are formed of non-magnetic material;
a main pole film formed of a magnetically soft material having a high permeability and which is held sandwiched between the first and the second joined blocks;
at least one of the blocks carrying a multi-layer film disposed in abutting relationship with the main pole film, the multi-layer film comprising alternate layers of a magnetically soft material having a high permeability and a non-magnetic material.

2. A perpendicular magnetic head according to claim 1 in which the multi-layer film is located at a given distance spaced from a region of the main pole which is disposed in sliding contact with a magnetic recording medium.

3. A perpendicular magnetic head according to claim 2 in which one end of the multi-layer film is located at a given distance from one end of the main pole which is adapted to be disposed to make sliding contact with the magnetic recording medium.

4. A perpendicular magnetic head according to claim 1, in which the first and the second block are formed of a non-magnetic material such as ceramic or vitreous carbon.

5. A perpendicular magnetic head according to claim 1, in which the first and the second blocks are joined together by an epoxy resin adhesive of a low viscosity.

6. A perpendicular magnetic head comprising:
a main pole including
a main pole film defined by a very thin film of a magnetically soft material having a high permeability;
a first block of non-magnetic material having an increased thickness relative to the thin film, the first block including a joining surface which is adapted to be joined with one side of the main pole film;
a multi-layer film having a joining surface which is adapted to be joined to the other side of the main pole film, the multi-layer film comprising a plurality of laminated, very thin layers;
and a second block having an increased thickness relative to the main pole film and formed of a non-magnetic material, the second block being joined to the other surface of the multi-layer film which is opposite from the joining surface and to a surface portion of the main pole film in a region where the multi-layer film is not joined thereto;
the head also comprising a winding for passing an electric current information signal and disposed around the main pole.

7. A perpendicular magnetic head according to claim 6 in which the multi-layer film is disposed at a given distance spaced upwardly from the lower end face of the main pole film which is disposed to make sliding contact with a magnetic recording medium.

8. A perpendicular magnetic head according to claim 6 in which the first and the second block are formed of a non-magnetic material such as ceramic or vitreous carbon.

9. A perpendicular magnetic head according to claim 6 in which the first and the second blocks are joined together by an epoxy resin adhesive of a low viscosity.

10. A perpendicular magnetic head comprising a main pole, including:
a main pole film formed of a very thin film of a magnetically soft material having a high permeability;
a first block having an increased thickness relative to the thin film and formed of a non-magnetic material and having a joining surface which is adapted to be joined to one side of the main pole film;

a multi-layer film formed by a plurality of very thin, laminated layers and having a joining surface which is adapted to be joined to the other side of the main pole film;

and a second block having an increased thickness relative to the thin film and formed of a non-magnetic material, the second block being joined to the other surface of the multi-layer film which is opposite from the joining surface and to that surface portion of the other surface to the main pole film where the multi-layer film is not joined;

the head also comprising an auxiliary pole including a block formed of a magnetizable material having a high permeability and disposed in opposing relationship with the main pole, said block carrying a winding for receiving an electric current.

11. A perpendicular magnetic head according to claim 10 in which the multi-layer film is spaced a given distance upwardly from the lower end face of the main pole film which is disposed in sliding contact with a magnetic recording medium.

12. A perpendicular magnetic head according to claim 10 in which the first and the second block are formed of a non-magnetic material such as ceramic or vitreous carbon.

13. A perpendicular magnetic head according to claim 10 in which the first and second blocks are joined together by an epoxy resin adhesive of a low viscosity.

14. A perpendicular magnetic head comprising a main pole including:
a main pole film defined by a very thin sheet-like film of a magnetically soft material having a high permeability, said sheet like film having opposing joining surfaces,
a pair of multi-layer films, each formed by a plurality of laminated, very thin layers, the multi-layer films each having a first joining surface, each of which first joining surfaces are joined to respective ones of the opposing surfaces of the main pole film so as to be arranged in opposing relationship with each other,
at least a portion of the main pole film extending beyond said pair of multi-layer films so that a portion of said main pole film opposing joining surfaces are not covered by said pair of multi-layer films,
said pair of multi-layer films each having an exposed second surface opposite the associated joining surface of the multi-layer film,
a first and a second block each having an increased thickness relative to the main pole film and being formed of a non-magnetic material, the respective blocks each being joined to an exposed second surface of an associated one of the pair of the multi-layer films and to an associated one of the exposed surfaces of the main pole film where the multi-layer film is not joined,
the head further comprising a winding disposed around the main pole, said winding being provided to receive an electric current representing an information signal.

15. A perpendicular magnetic head according to claim 14 in which each of the multi-layer films is spaced a given distance away from an end face of the main pole film, which end face is adapted to be disposed for sliding contact with a magnetic recording medium.

16. A perpendicular magnetic head according to claim 14 in which the first and the second joined blocks are formed of a non-magnetic material such as ceramics or vitreous glass.

17. A perpendicular magnetic head according to claim 14 in which the main pole film is formed on a first one of the joined blocks and the remaining joined block is joined together with the first joined block by epoxy resin adhesive which has a low viscosity.

18. A perpendicular magnetic head comprising a main pole including:
a main pole film defined by a very thin sheet-like film of a magnetically soft material having a high permeability,
a pair of multi-layer films each formed by a plurality of laminated, very thin layers, the multi-layer films each having first and second joining surfaces said first joining surfaces being respectively joined to the opposite sides of the main pole film so as to be arranged in opposing relationship with each other,
at least a portion of the main pole film extending beyond said pair of multi-layer films so that a portion of the opposing joining surfaces are not covered by said pair of joining multi-layer films,
a first and a second block each having an increased thickness relative to the main pole film and being formed of a non-magnetic material, the blocks each being respectively joined to one of the second surfaces of an associated one of the pair of multi-layer films and to a surface of the main pole film where the multi-layer film is not joined,
the head further comprising an auxiliary pole formed of a block of a high permeability magnetic material disposed in opposing relationship with the main pole and carrying a winding therearound said winding being provided to receive an electrical current representing an information signal.

19. A perpendicular magnetic head according to claim 18 in which the multi-layer film is spaced a given distance upwardly from an end face of the main pole film, which end face is adapted to be disposed sliding contact with a magnetic recording medium.

20. A perpendicular magnetic head according to claim 18 in which the first and the second joined blocks are formed of a non-magnetic material such as ceramics or vitreous glass.

21. A perpendicular magnetic head according to claim 18 in which one of the joined blocks which carries the main pole film and the other joined block carrying no main pole film are joined together by epoxy resin adhesive which has a low viscosity.

22. A perpendicular magnetic head comprising:
first and second blocks formed of non-magnetic material;
a main pole film formed of a magnetically soft material having a high permeability being sandwiched between said first and second blocks;
a multi-layer film disposed between one surface of the main pole film and one surface of one of said blocks, the multi-layer film comprising selected layers of a magnetically soft material having a high permeability and remaining layers of a non-magnetic material and arranged substantially parallel to the main pole film.

23. A perpendicular magnetic head according to claim 22 wherein one of the blocks is provided with a surface portion of reduced thickness to form a slot with said main pole film for receiving said multi-layer film.

24. A perpendicular magnetic head according to claim 22 further comprising;
a second multi-layer film substantially similar to the first-mentioned multi-layer film disposed between the surface of the main pole film opposite said one surface and one surface of the remaining one of said blocks, said second multi-layer film being arranged substantially parallel to the main pole film.

* * * * *